Sept. 17, 1968 G. BALLIANO 3,401,760
HAND-OPERATED POSTHOLE BORER FOR POSTS, SAPLINGS, VINES
AND SIMILAR PLANTS, PROVIDED WITH A
SCREW, AND WITH A CUTTING EDGE
Filed March 8, 1966
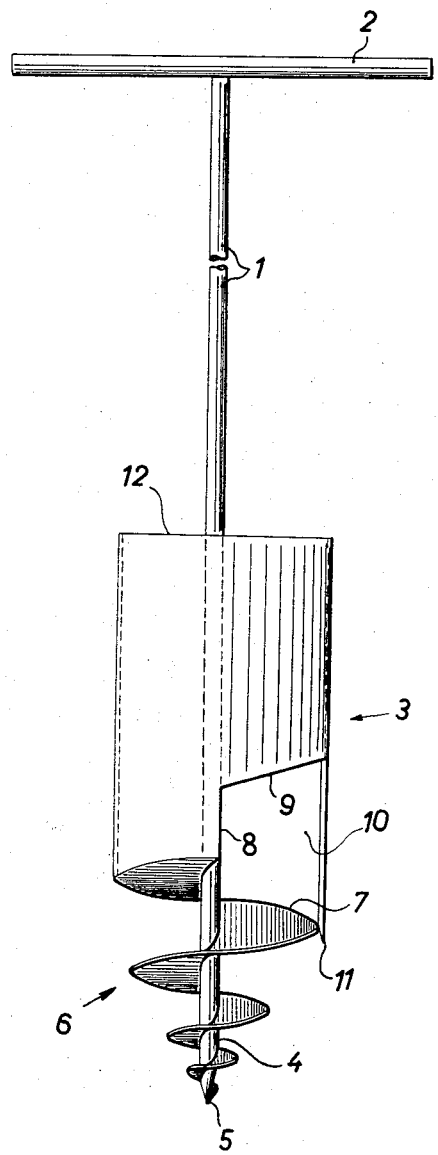
INVENTOR
Giuseppino Balliano
BY Paul & Paul
ATTORNEYS United States Patent Office 3,401,760
Patented Sept. 17, 1968

3,401,760
HAND-OPERATED POSTHOLE BORER FOR POSTS, SAPLINGS, VINES AND SIMILAR PLANTS, PROVIDED WITH A SCREW, AND WITH A CUTTING EDGE
Giuseppino Balliano, Via Mombarcaro 92, Turin, Italy
Filed Mar. 8, 1966, Ser. No. 532,686
Claims priority, application Italy, Nov. 13, 1965, 25,686/65
3 Claims. (Cl. 175—308)

ABSTRACT OF THE DISCLOSURE

A hand-operated posthole border for posts, saplings, vines and similar plants, consisting of a shaft pointed at one end and having a handle at the opposite end, a soil cutting screw arranged adjacent the pointed end of the shaft and having spirals decreasing in diameter and pitch toward the pointed end, and a tubular cylinder disposed above the cutting screw, surrounding the shaft and serving to receive the extracted soil. The shell of the cylinder is provided with an opening adjacent the uppermost spiral of the cutting screw to facilitate the introduction of the extracted soil into the cylinder. The lowermost circumferential edge of the cylinder is provided with a downwardly extending cutting blade adjacent the opening in the cylinder shell to cut the posthole with a smooth circumferential wall. The distance of this cutting blade from the axis of the cylinder is slightly greater than that of the opposed cylinder wall to provide a posthole slightly larger in diameter than the overall diameter of the cylinder to facilitate the extraction of the cylinder filled with soil from the posthole.

---

The work of digging holes for the purpose of setting up poles or for planting saplings, vines and similar plants is well known to be very strenuous in so far as the said holes have to be prepared with spades or similar tools. It is also clear that such a method of digging is inefficient in that the holes are not uniform and indeed tend to be too large with the result that the surrounding soil has to be rammed down in order to secure stability in the object that has been planted. Furthermore, as well as being laborious, known methods require a considerable amount of time.

The posthole borer according to the present invention is intended to eliminate the above-mentioned difficulties and allows the speedy preparation in series of uniform, vertical holes suitable for posts, saplings, vines and similar objects. More particularly the borer, according to the invention, consists of a shaft pointed at one end, there passing around such end a screw the circumference and the pitch of which decrease towards the said point; the said screw being surmounted, on the thread having the largest diameter, by a tubular cylinder through which the said shaft passes, off-centre, and in which is provided an opening through which passes all the soil extracted by means of the screw so that the cylinder in fact also serves as a container.

On one vertical edge of the opening in the cylinder, and extending downwards with respect to the said opening there is a cutting edge, or alternatively a blade welded to the edge, the purpose of which is to cut the soil which, as already described, is pushed upwards into the cylinder by the screw. The operator by means of a handle, of known type, fixed to the upper end of the shaft, causes the screw to penetrate into the ground so as to form a uniform, cylindrical and vertical hole. Moreover, since the cylinder is open at its top, the operator can see the soil as it accumulates therein and can empty it out when the implement is withdrawn from the ground.

A further characteristic of the posthole borer according to the invention consists in the fact that the said shaft is mounted off-centre with respect to the cylinder so that during the rotation of the shaft by hand a degree of free play is obtained which facilitates the eventual withdrawal of the implement from the ground; this being an important advantage when the borer is working in compact soil.

The borer, according to the invention, will now be described with reference to the attached drawing, offered as an example only and not by way of limitation, in which the single figure shows the borer in vertical elevation.

The shaft 1, provided at one end with a common handle 2, passes down through a cylinder 3 and at its other end 4 terminates in a point 5. Between the said point 5 and the cylinder 3 there is fitted a screw 6, of one piece with the shaft 1, the threads or spirals of which have both a circumference and a pitch which decrease in the direction of the point 5 and which are designed to enter the ground when the operator turns the shaft 1 by means of the handle 2.

More over the thread or spiral which has the greatest diameter 7 forms the base of the said cylinder 3, this latter being partly cut back along the lines 8 and 9 so as to create an opening 10 into which is pushed the soil raised by the thread or spiral 7.

On one side of the said cylinder 3, and more particularly alongside the said opening 10 and extending downwards with respect to it and to the thread or spiral 7, there is a cutting edge 11 which has the task of cutting the ground so as to form a smooth, vertical and cylindrical hole.

According to a variation of the invention, the said cutting edge 11 is replaced by a blade welded to the cylinder 3.

On its upper side the said cylinder 3 is open at 12 so that it is possible to bore more deeply into the ground than the actual length of the cylinder 3 and also so as to allow the emptying out of the soil which has entered the cylinder 3 through the access opening 10.

Moreover the shaft 1 is mounted slightly off-centre with respect to the said access opening 10 so that during the rotation of the shaft by hand a degree of free play is obtained which facilitates the eventual withdrawal of the borer from the ground.

What I claim is:
1. A hand-operated posthole borer comprising a shaft pointed at one end and having a handle at the opposite end,
   a soil cutting screw arranged adjacent the pointed end of the shaft and formed integrally therewith,
   said soil cutting screw having spirals decreasing in diameter and pitch toward said pointed end,
   a tubular cyilnder disposed above said soil cutting screw and surrounding said shaft so as to receive the extracted soil,
   the uppermost spiral of said soil cutting screw terminating with its outer edge at the circumference of said cylinder and forming the bottom of the latter, and
   an opening in the shell of said cylinder adjacent the uppermost spiral of said cutting screw.
2. A hand-operated posthole borer as claimed in claim

1, wherein a downwardly extending cutting blade is provided at the lowermost circumferential edge of the cylinder adjacent the opening therein.

3. A hand-operated posthole borer as claimed in claim 2, wherein the shaft is mounted off-center with respect to the axis of the cylinder so that the cutting blade at the lowermost circumferential edge of the cylinder is at a slightly greater distance from the axis of the cylinder than the opposed circumferential cylinder wall.

References Cited

UNITED STATES PATENTS

| | | | |
|---|---|---|---|
| 150,051 | 4/1874 | Jilz | 175—323 X |
| 162,966 | 5/1875 | Strong | 175—308 X |
| 2,352,326 | 6/1944 | Kandle | 175—310 X |
| 2,810,553 | 10/1957 | Bigelow | 175—310 |

NILE C. BYERS, Jr., *Primary Examiner.*